United States Patent
Kawakita

[11] Patent Number: 6,008,454
[45] Date of Patent: Dec. 28, 1999

[54] STORAGE BOX FOR ELECTRONIC CONTROL UNITS

[75] Inventor: Shinji Kawakita, Yokkaichi, Japan

[73] Assignee: Sumitomo Wiring Systems, Ltd., Japan

[21] Appl. No.: 09/030,666

[22] Filed: Feb. 25, 1998

[30] Foreign Application Priority Data

Feb. 25, 1997 [JP] Japan .................................. 9-041113

[51] Int. Cl.⁶ .................................................. H05K 5/00
[52] U.S. Cl. ...................... 174/52.1; 165/80.3; 361/690
[58] Field of Search ................. 165/80.2, 80.3; 174/52.1, 65 SS; 361/690, 691, 692, 693, 701, 728, 694, 695

[56] References Cited

U.S. PATENT DOCUMENTS

| 4,498,119 | 2/1985 | Cronin . |
| 4,763,224 | 8/1988 | Bentz et al. . |
| 5,789,704 | 8/1998 | Kawakita ................................ 174/52.1 |

*Primary Examiner*—Harold Joyce
*Attorney, Agent, or Firm*—Jordan B. Bierman; Bierman, Muserlian and Lucas

[57] ABSTRACT

The storage box employs an inner box surrounded by an outer box. The inner box houses an electronic control unit. Between the two boxes is a space in which air circulates to cool the electronic control unit. A hole in the inner box is sealed with a filter that is impervious to water but allows air to freely pass. Thus, the electronic control unit is cooled without being damaged by water and dirt in the cooling air.

4 Claims, 4 Drawing Sheets

STORAGE BOX FOR ELECTRONIC CONTROL UNITS

This Application claims the benefit of the priority of Japanese Application No. 9-41113, filed Feb. 25, 1997.

The present Invention relates to storage boxes for automotive control units; especially to storage boxes mounted in the engine compartment of an automobile which protect electronic control units from damage due to water and dirt from the road and from excessive heat from the engine.

BACKGROUND OF THE INVENTION

To assist in understanding the context of the Invention, a conventional insulation terminal and a method for producing the same will be described below by referring to FIGS. 3 and 4.

Automobiles are equipped with electronic units for controlling various devices such as electronic fuel injection systems, antilock brakes, and the like. These units can be placed in the passenger compartment or the engine compartment. In the former case, as shown in FIG. 3, control unit 1 is disposed in passenger compartment 2a of automobile 2. Wire harness W/H must pass from engine compartment 2b to passenger compartment 2a. Not only would this require wire harness W/H to be long, it also necessitates an opening in panel 2c which separates the passenger compartment from the engine compartment. This requires complex operations and increases costs.

On the other hand, if the control unit is located in the engine compartment, it is exposed to water which can enter the compartment and thereby damage the unit. Moreover, the heat generated by the engine also presents a serious problem. These units contain semi-conductors which do not have adequate heat resistance. In order to obtain such resistance, special semi-conductors must be used. This also increases the cost.

Another solution for protecting the electronic control units has been suggested in Japanese Patent Application number 7-321584. In this Application, a storage box protects the electronic control units and is disposed in the engine room. As shown in FIG. 4, electronic control unit 1 is stored in inner box 3 which, in turn, is stored in outer box 4. Outer box 4 is sealed with cover 5. Spaces 5A and 5B are formed between inner box 3 and outer box 4 to allow cool air to circulate between the two boxes and prevent overheating. Inner box 3 is watertight due to a seal at opening 3a. Since inner box 3 is watertight, it prevents water from entering the inside of inner box 3 and damaging the electronic control units.

Heat is generated by the electronic control units which, in turn, increases the temperature inside inner box 3. It has also been found that, with the storage box shown in FIG. 4, the temperature in spaces 5A and 5B is lower than the temperature inside inner box 3. This difference in temperature results in a negative pressure because air tries to flow from the inside of inner box 3 into spaces 5A and 5B, but is prevented from doing so because inner box 3 is watertight. This negative pressure causes the inner box to deform, which, in turn, creates a gap that allows water and dirt to enter.

SUMMARY OF THE PRESENT INVENTION

The object of the present Invention is to prevent the creation of a negative pressure between the cooling air circulation space and the inside of the inner box while maintaining the dual box design.

Broadly, the present Invention relates to a storage box for control units, especially those which are electronic. The storage box comprises a storage box main unit which is divided into an outer box surrounding an inner box. The inner box houses the electronic control units in a storage section and a space for circulation of cooling air is provided between the outer box and the inner box. A cover is employed for sealing the upper surface of the storage box main unit. An intake opening for introducing outside air and an exhaust opening for discharging this introduced air after it has been circulated in the air circulation space are formed in the outside wall of the storage box main unit.

A filter opening is disposed on a side wall of the inner box at its storage section portion. A filter that lets air but not water through is attached to this filter opening. The filter allows the air to flow from the air circulation space into the storage section of the inner box. Thus, outside air passing through the space between the inside and outside boxes, goes through the filter and flows into the inside of the storage section of the inner box. This maintains the temperature of the storage section at the temperature of the space, thereby alleviating the negative pressure difference, and increases the cooling of the electronic control units. Also, the electronic control units are protected from moisture in the cooling air by the filter.

BRIEF DESCRIPTION OF THE DRAWINGS

In the accompanying drawings, constituting a part hereof, and in which like reference characters indicate like parts.

DETAILED DESCRIPTION OF THE PRESENT INVENTION

Figure 1:
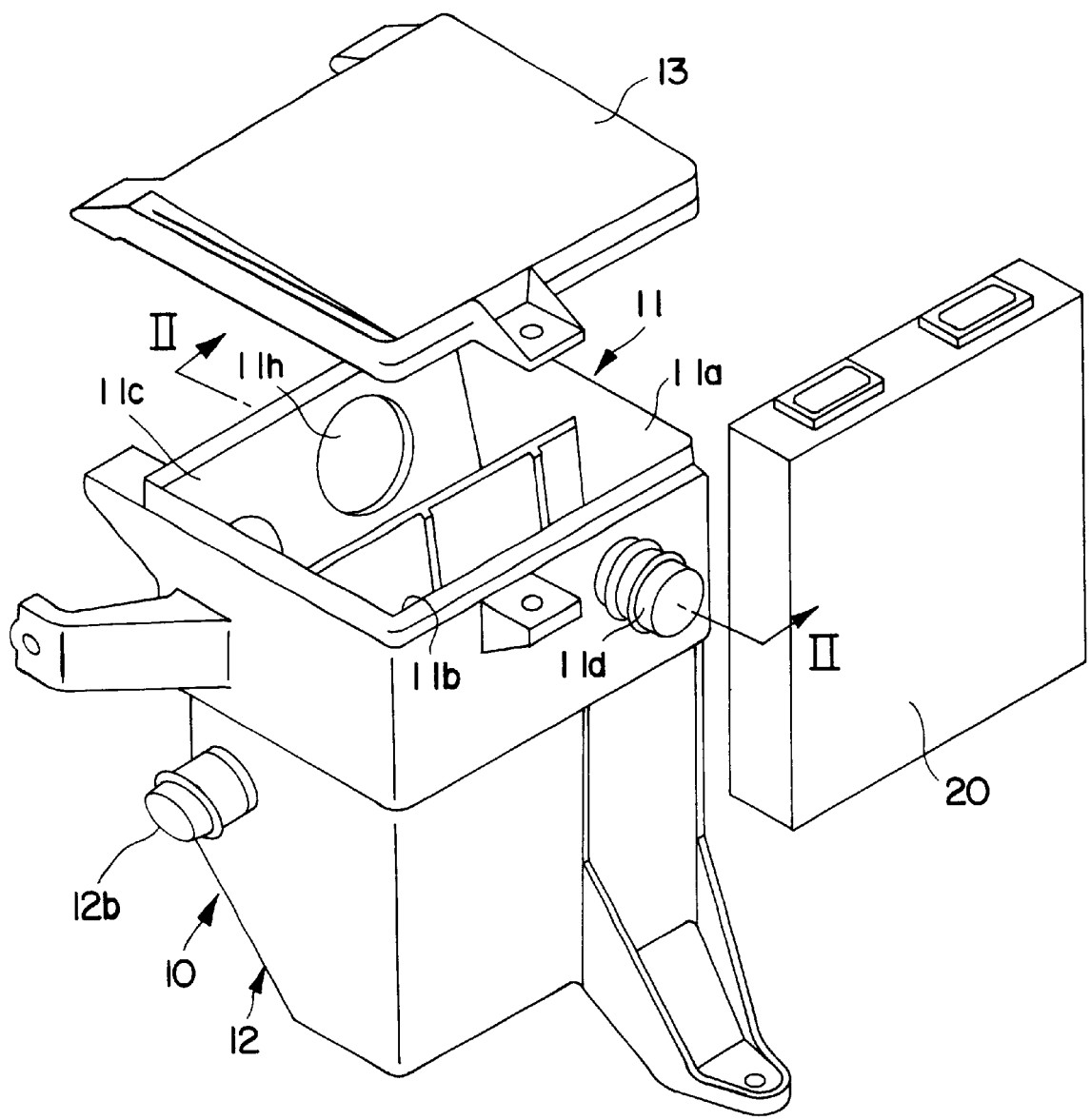
FIG. 1 illustrates a preferred embodiment of the present Invention.
Figure 2:
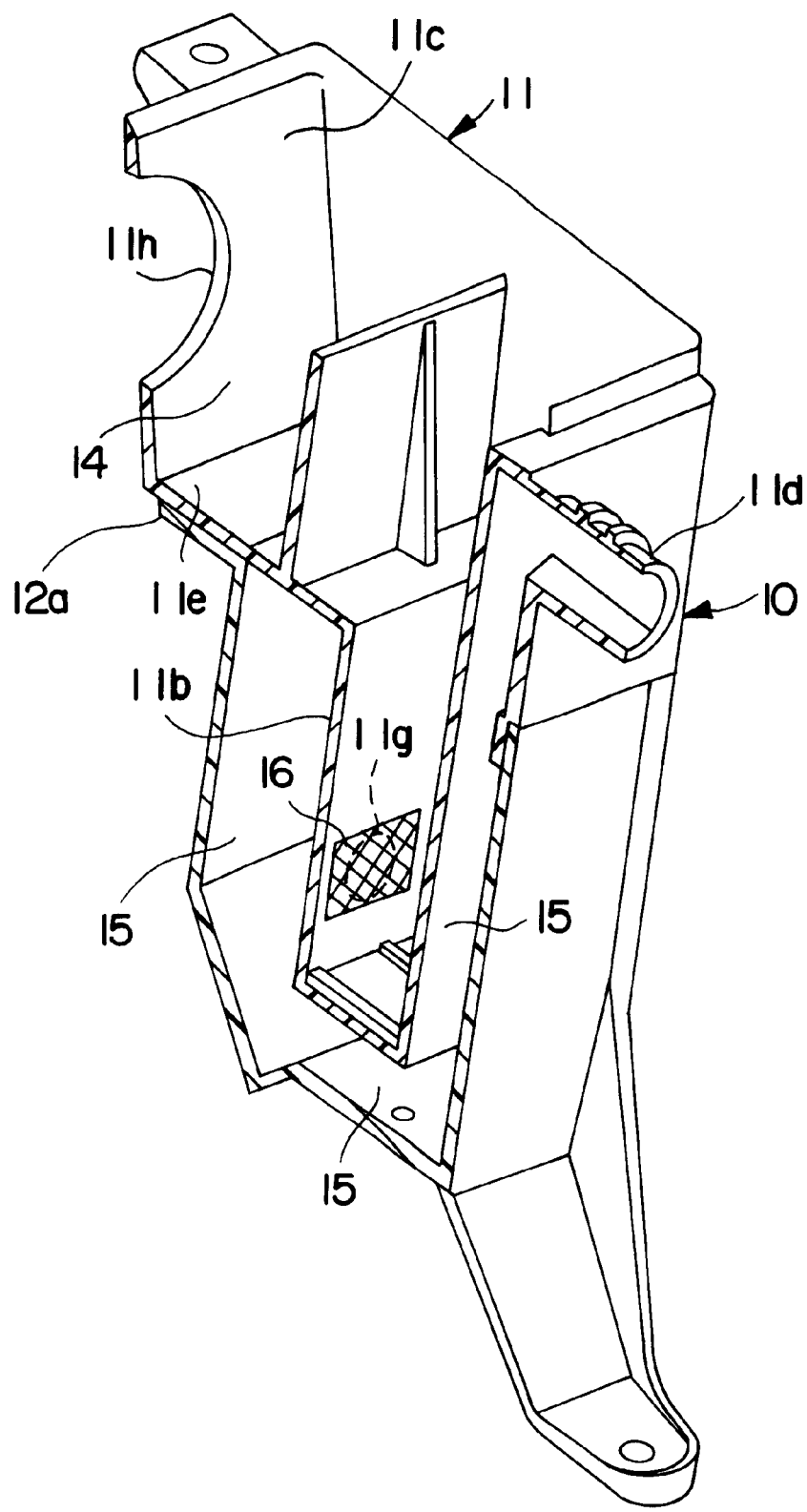
FIG. 2 illustrates a cross section taken along lines II—II of FIG. 1.
Figure 3:
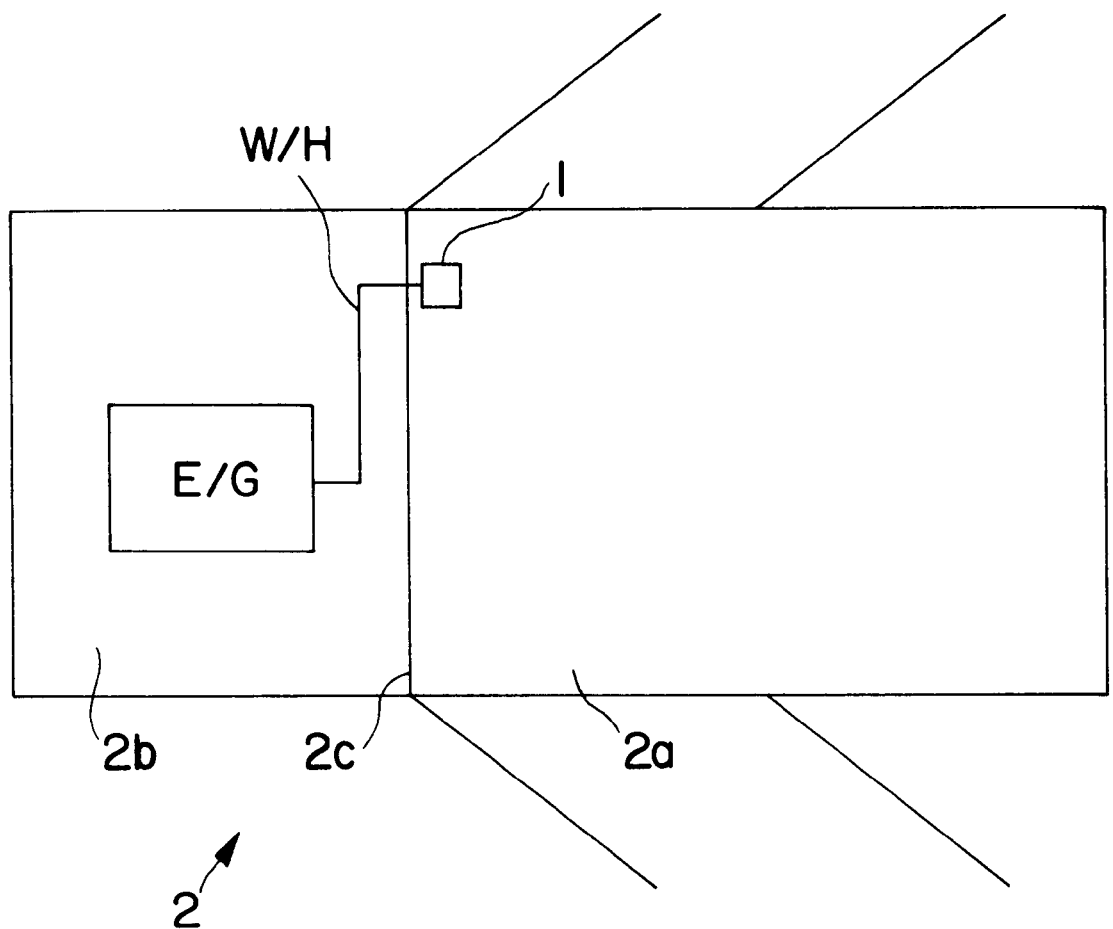
FIG. 3 illustrates a prior art solution.
Figure 4:
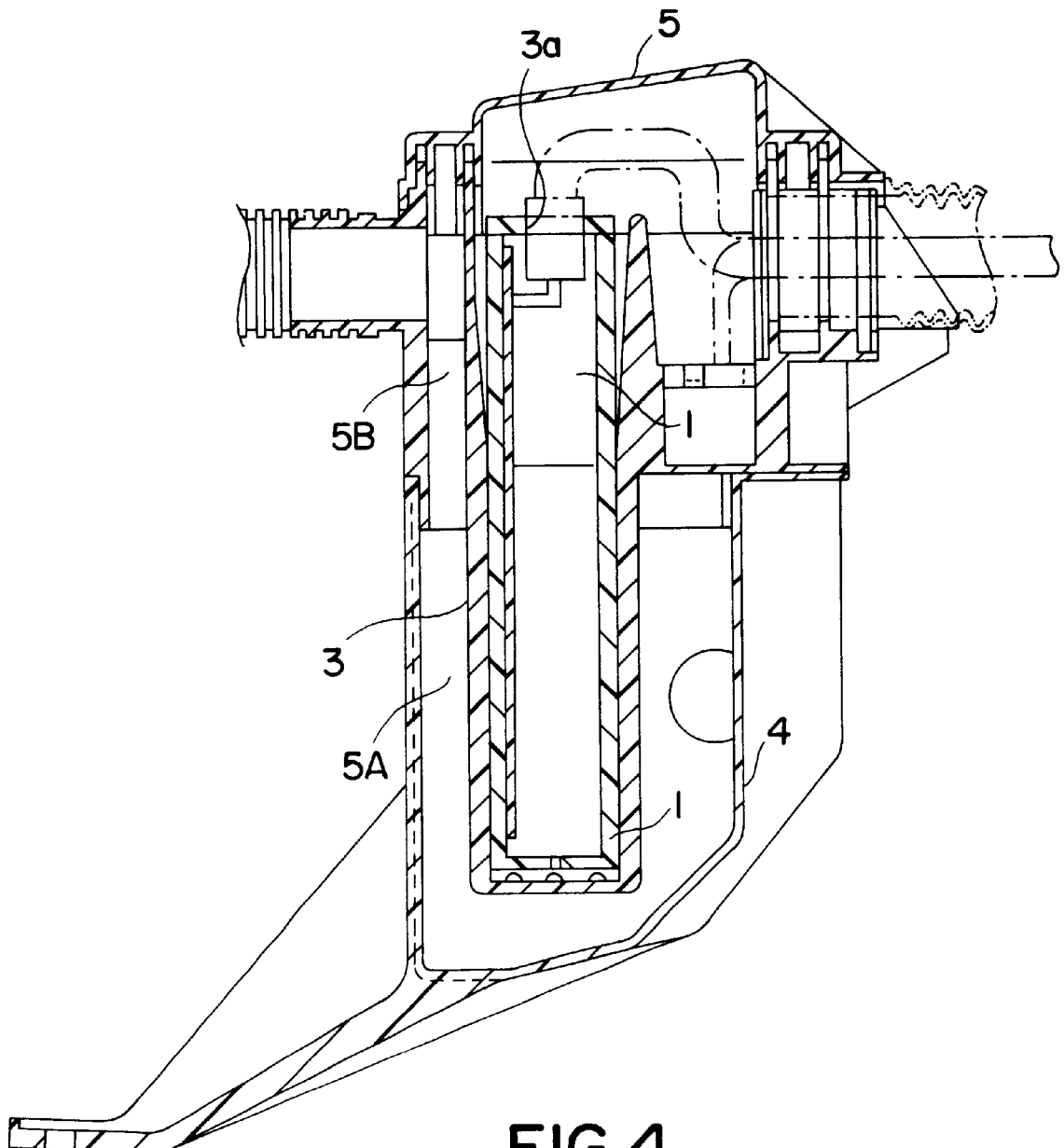
FIG. 4 illustrates another prior art solution.

Referring to FIG. 1 and FIG. 2, storage box for electronic control unit 20 is disposed in the engine compartment of an automobile. The storage box is made from plastic and comprises a storage box main unit 10 which is divided into inner box 11, outer box 12, and cover 13 which fits over the main unit.

Inner box 11 comprises storage section 11b, having box opening 11a, through which the electronic control unit is inserted. Outer perimeter wall 11c of inner box 11 surrounds the upper portion of storage section 11b on three sides while leaving inner space 14 open. Inner space 14 serves as a cooling air circulation space that is in communication with air circulation space 15 between outer box 12 and inner box 11. Exhaust opening 11d is formed in outer perimeter wall 11c and inlet opening 12b is formed on outer box 12. Outer perimeter wall 11c projects upward from mounting plate 11e.

Storage section 11b of inner box 11, which serves as the storage section for electronic control unit 20, is formed with filter opening 11g. Filter 16 is attached over filter opening 11g and allows air to pass but not water. In the preferred embodiment, Poreflon (manufactured by Sumitomo Electric Industries, Ltd.) is used as filter 16. Fillers of this type are conventional. Typically, they have very small pores, on the order of 0.1 to 10 microns in diameter. Filter 16 allows cooling air (outside air) to flow to electronic control unit 20 housed in storage section 11b through cooling air circulation space 15, thereby cooling electronic control unit 20 and preventing the build-up of negative pressure while also maintaining a good watertight environment.

Grommet hole 11h is formed on outer perimeter wall 11c on the side opposite exhaust opening 11d. A wire connected to electronic control unit 20 is pulled through grommet hole 11h and a grommet is used to seal the hole and provide a watertight construction.

Seat 12a is at the lower portion of inner box 11 and acts as a seat for mounting plate 11e. Also, intake opening 12b is disposed on outer box 12. Cooling air is provided to intake opening 12b by an intake tube of an air conditioning device (not shown in the figure). Alternatively, intake opening 12b is left open to the outside air. When inner box 11 and outer box 12 are assembled, with mounting plate 11e mounted on seat 12a, space 15 and space 14 around inner box 11 are made continuous. The cooling air introduced through intake opening 12b flows through spaces 15 and 14, and exits through exhaust opening 11d.

Outer box 12 is assembled integrally with inner box 11 through welding or the like to form storage box main unit 10. After electronic control unit 20 is placed in unit storage section 11b of the inner box, cover 13 is placed over storage box main unit 10 and locked.

Electronic control unit 20 is cooled by the cooling air (outside air) introduced through intake opening 12b and circulated in spaces 14 and 15. Since filter 16 is attached to filter opening 11g, cooling air also flows through filter 16 into space 11b, while hot air from electronic control unit 20 is discharged into space 15. Thus, the differences in temperature between spaces 14 and 15 and unit storage section 11b, are eliminated.

Hence, the problem in the conventional technology involving the negative pressure is overcome. Consequently, the integrity of the inner box is maintained and water is prevented from entering into the storing section.

I claim:

1. A storage box for a control unit comprising an outer box having an outer opening at its upper end, an inner box having a storage section and an inner space, said storage section extending at least partly into said outer box, said inner space being adjacent at least part of said storage section, an air circulation space between said storage section and said outer box and in communication with said inner space, an air inlet and an exhaust opening on said storage box and in communication with said inner space and said air circulation space, whereby air circulates through said air circulation space and said inner space.

2. The storage box of claim 1 wherein there is a filter opening between said inner space or said air circulation space and said storage section, a filter on said filter opening adapted to permit air but not liquid to pass therethrough.

3. The storage box of claim 1 wherein said inner box has a box opening at its upper end and a cover on said opening.

4. The storage box of claim 1 wherein said air inlet is connected to a source of cooled air.

* * * * *